Figure 1:
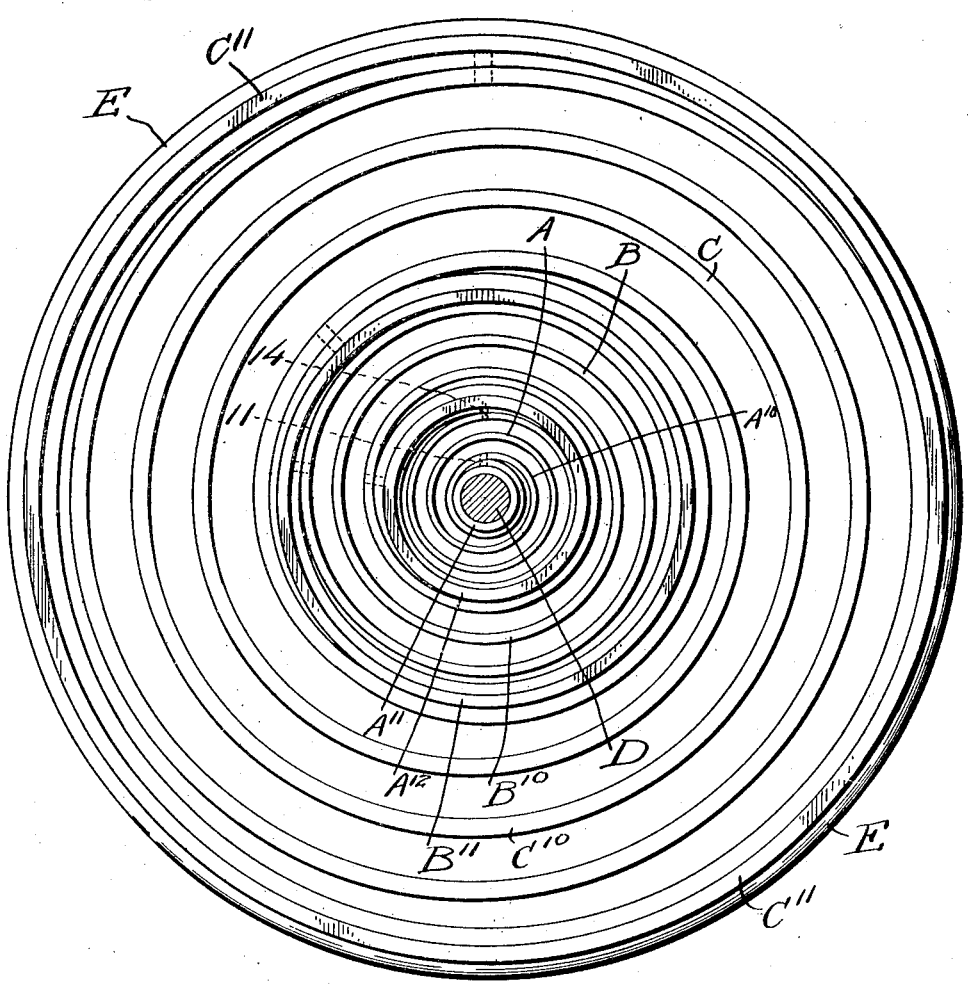

W. F. DOLL.
RESILIENT WHEEL.
APPLICATION FILED DEC. 27, 1912.

1,091,302.

Patented Mar. 24, 1914.
2 SHEETS—SHEET 1.

Witnesses

Inventor
William F. Doll
By C. J. Stockman
Attorney

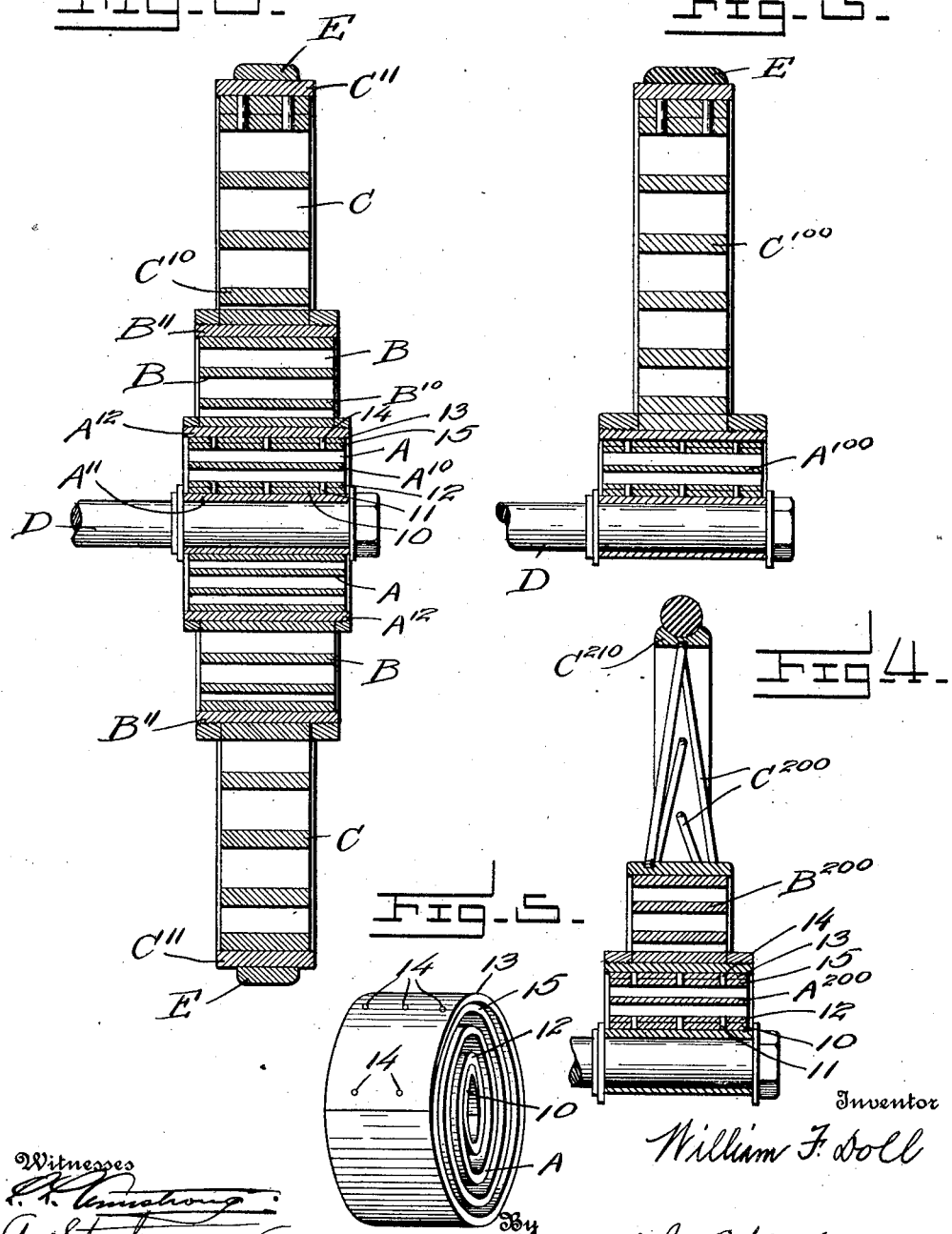

UNITED STATES PATENT OFFICE.

WILLIAM F. DOLL, OF NEW YORK, N. Y., ASSIGNOR OF ONE-HALF TO LEE McCLUNG, OF WASHINGTON, DISTRICT OF COLUMBIA.

RESILIENT WHEEL.

1,091,302.　　　　　　Specification of Letters Patent.　　Patented Mar. 24, 1914.

Application filed December 27, 1912.　Serial No. 738,858.

*To all whom it may concern:*

Be it known that I, WILLIAM F. DOLL, a citizen of the United States, residing in Manhattan borough, in the city and county of New York and State of New York, have invented new and useful Improvements in Resilient Wheels, of which the following is a specification.

This invention relates to resilient wheels or the like, including, for example, automobile wheels, truck wheels, motocycle wheels, bicycle wheels, carriage wheels, wagon wheels, gear wheels, pulleys, etc.

One of the most important purposes of the present invention is to provide a resilient wheel or the like with a plurality of spirally coiled springs one of which is arranged in the axis of the other, the said springs being of different strengths whereby the limits within which the wheel is elastic or resilient is substantially expanded and systematically regulated—the lighter spring or springs being elastic under predetermined loads or forces and the heavier spring or springs being elastic under loads or forces at which the lighter spring or springs are dead.

Another of the important purposes of the invention is to provide a resilient wheel whose hub and body are formed of or provided with spirally coiled springs of relatively different strengths, one of said springs encircling the other.

Another of the important purposes of the present invention is to provide a spring wheel or the like of the kind herein stated, whose springs are arranged to be conveniently removed and applied to afford, for example, facilities for the changing of one or more of the springs to suit a changed load.

These purposes of the present invention, and others which will be apparent from the following description and need not be set forth in detail herein, are subserved by the construction illustrated in the accompanying drawings, which is exemplary of the present invention, but to the details of which the invention is not restricted, as many changes may be made in this exemplified embodiment without departing from the spirit of the invention or the scope of the subjoined claims.

In said drawings:—Figure 1 is a side elevation of a wheel embodying the present improvements; Fig. 2 is a vertical section through the same; Fig. 3 is a vertical section of the upper part of a wheel, illustrating a modified form, the intermediate coiled spring shown in Figs. 1 and 2 being omitted; Fig. 4 is a vertical section through the upper part of a further modified form of the invention, showing the spirally coiled body or spoke-portion of the other forms omitted and rigid spokes substituted therefor. Fig. 5 is a detail perspective view of one of the spirally coiled springs.

The same characters of reference denote corresponding parts in the several views.

In the particular embodiment of the invention shown in Figs. 1 and 2 of the accompanying drawings, the wheel is illustrated as being composed of three separate spring members, marked A, B, and C, respectively, having spirally coiled springs $A^{10}$, $B^{10}$ and $C^{10}$ and sleeves or casings $A^{11}$, $A^{12}$, $B^{11}$ and $C^{11}$. The springs are of different strengths, the innermost spring $A^{10}$ being elastic under light loads, the intermediate spring $B^{10}$ being elastic under heavier loads and the outermost spring $C^{10}$ being elastic under still heavier loads. In this particular embodiment of the invention each spring member is shown as being provided with a single coiled spring, but it is apparent that any or all of the spring members may, if desired, have more than one coiled spring, in which event the springs will preferably be placed side by side, examples of such arrangements of springs being shown in my application for Letters Patent, Serial No. 738,859, filed of even date herewith. In any case, it is preferred that the spring members be of gradually decreasing width from the innermost member outward in order that the wheel will have a substantially convexo-convex outline. This particular form contributes to the strength of the wheel, makes it equally resilient in all directions and places the center of gravity at the center of the wheel. The innermost sleeve $A^{11}$ is arranged within the inner coil of the spring $A^{10}$ and receives the axle or shaft D upon which the wheel is mounted; the sleeve $A^{12}$ encircles said spring $A^{10}$ and is mounted in the spring $B^{10}$; the sleeve $B^{11}$ encircles the spring $B^{10}$ and is mounted in the spring $C^{10}$ and the sleeve $C^{11}$ encircles the spring $C^{10}$ and in this particular embodiment of the invention constitutes the rim or felly of the wheel. When the wheel is employed as a vehicle wheel the sleeve $C^{11}$ may be and preferably is encircled by an appropriate tire as indicated by the part E. In the particular embodiment of the invention shown in Figs. 1 and 2, the spring $A^{10}$ is broader and thinner than the spring $B^{10}$ and the spring $B^{10}$ is broader and thinner than the spring $C^{10}$ whereby the desirable convexo-convex shape of the wheel and the successively increasing strengths of the spring members thereof are obtained; but as already stated this, while being preferred, is not essential to the invention, for the reason that a plurality of springs may be mounted side by side in each spring member in which event the shape referred to may be secured, for example, by spacing the springs of one member farther apart than the springs of the next member arranged outwardly beyond the same. In short, I would have it understood that I do not restrict myself to any particular plural number of spring members arranged one inside the other, as there may be two, three, four or more of such members so arranged in a wheel; nor do I limit myself to any particular number or construction of coiled springs in any of said spring members, and further I would have it understood that in some cases any one or more sleeves may be omitted without departing from the scope of the invention defined by the subjoined claims.

In Fig. 3 the intermediate member B of the wheel shown in Figs. 1 and 2 is omitted, as an example of a construction wherein a number other than three spring members is employed. The spring members shown in Fig. 3 are designated $A^{100}$ and $C^{100}$ respectively.

In the forms of the invention shown in Figs. 1, 2 and 3 the body or spoke portion C or $C^{100}$ is shown as being of spirally-coiled spring construction, but in some cases it may be preferred to use rigid or comparatively rigid spokes. An example of such a construction is illustrated in Fig. 4, wherein there are two spring members designated $A^{200}$ and $B^{200}$ respectively, an outer rim or felly marked $C^{210}$ and wire spokes $C^{200}$, between the outer rim or felly $C^{210}$ and the spring member $B^{200}$, such spokes being rigid as compared with the spirally-coiled spoke. It is apparent that other substantially or comparatively rigid spokes, such as wooden spokes for example, may be employed in lieu of wire spokes if desired, the illustrated embodiment being merely intended to exemplify a construction in which rigid or comparatively rigid spokes are employed instead of a spirally coiled spoke-portion. In the construction of wheel exemplified by Fig. 4 the two spring members $A^{200}$ and $B^{200}$ will be assumed to be the hub portion of the wheel and will be so treated hereinafter. Each of the spirally-coiled springs preferably has its innermost coil 10 fastened as by means of rivets 11, for example, to the next adjacent coil 12 of the spring, and its outermost coil 13 preferably similarly is fastened as by rivets 14 to the next adjacent coil 15 of the spring, whereby the spring is maintained in a partially wound condition, so to speak, and prevented from opening out when it is not inserted in the wheel. The springs, therefore, can be readily inserted into or removed from the wheel. It will be noted that the ends of the sleeves are open to facilitate this change of springs. In some cases each wheel may be furnished with springs of various different strengths with the intention that they shall be interchanged to suit different loads and in such event it becomes particularly important to provide for the quick and easy removability of any one or more of the springs and the quick and easy substitution of another spring or springs therefor.

In lieu of the particular type of coiled springs herein mentioned, I may employ other styles of such springs, such, for example, as are illustrated in my patents numbered serially 629,003 and 641,846 respectively, or the type of springs in my applications for patents filed of even date herewith and numbered serially 738,859 and 738,860, respectively.

Having thus described the invention what I believe to be new and desire to secure by Letters Patent, is:—

1. A resilient wheel or the like, comprising a plurality of separate spirally-coiled springs, one of which is mounted in the axis of the other, said springs having their strengths so arranged that they will operate successively, one being elastic under loads which will not affect the other and the latter being in play when the limit of elasticity of the first is exceeded.

2. A resilient wheel or the like, comprising a plurality of separate spirally-coiled springs and a rigid sleeve interposed between said springs, one of the springs being mounted in the sleeve and the sleeve being mounted in the axis of the other spring, said springs having their strengths so arranged that they will operate successively, one being elastic under loads which will not affect the other and the latter being in play when the limit of elasticity of the first is exceeded.

3. A resilient wheel or the like, comprising a plurality of separate spirally-coiled springs and a rigid sleeve interposed between the said springs, one of said springs being mounted in the sleeve and the sleeve being mounted in the axis of the other spring, the springs respectively having coils which are secured together to retain them in partially wound condition and being readily removable from the sleeve.

4. A resilient wheel or the like, whose hub includes a spirally-coiled spring and a rigid sleeve encircling said spring, the body or spoke portion of the wheel being formed of a spirally-coiled spring which encircles said sleeve, the spring of the hub being of less strength than the spring of the body or spoke portion, whereby the hub spring is in play when the other spring is inert and the latter spring is in play when the limit of elasticity of the hub spring has been exceeded.

5. A resilient wheel or the like having its hub provided with a plurality of coiled springs of different strengths and a rigid sleeve between said springs, one of the springs being arranged in the sleeve and the sleeve being arranged in the axis of the other spring, the last named spring also having a rigid sleeve encircling its outermost convolution, the body or spoke portion of said wheel being also composed of a coiled spring, which encircles the last named sleeve and whose strength is different from those of the hub springs.

6. A resilient wheel or the like, comprising a plurality of separate spirally-coiled springs and a rigid sleeve interposed between said springs, the inner of the springs being broader and weaker than the outer one and the latter being arranged centrally thereover.

In testimony whereof I have hereunto set my hand in presence of two subscribing witnesses.

WILLIAM F. DOLL.

Witnesses:
JOHN J. RANAGAN,
ISABEL R. RICHARDS.

---

Copies of this patent may be obtained for five cents each, by addressing the "Commissioner of Patents, Washington, D. C."